(12) United States Patent
Steiner

(10) Patent No.: US 8,373,378 B2
(45) Date of Patent: Feb. 12, 2013

(54) SYSTEMS AND METHOD FOR MOTOR SPEED CONTROL

(76) Inventor: Robert E. Steiner, Chesterfield, MO (US)

( * ) Notice: Subject to any disclaimer, the term of this patent is extended or adjusted under 35 U.S.C. 154(b) by 316 days.

(21) Appl. No.: 12/958,526

(22) Filed: Dec. 2, 2010

(65) Prior Publication Data

US 2011/0181226 A1 Jul. 28, 2011

Related U.S. Application Data

(60) Provisional application No. 61/297,501, filed on Jan. 22, 2010.

(51) Int. Cl.
*H02P 23/04* (2006.01)

(52) U.S. Cl. ........ 318/772; 318/779; 318/768; 318/727; 318/776; 318/786; 318/816; 318/812

(58) Field of Classification Search .................. 318/772, 318/768, 727, 776, 779, 786, 816, 812, 531, 318/818

See application file for complete search history.

(56) References Cited

U.S. PATENT DOCUMENTS

| | | | | |
|---|---|---|---|---|
| 4,315,413 A | * | 2/1982 | Baker | 62/180 |
| 4,366,425 A | * | 12/1982 | Shen | 318/779 |
| 4,737,701 A | * | 4/1988 | Hoemann et al. | 318/772 |
| 4,937,513 A | * | 6/1990 | Hoemann et al. | 318/772 |
| 5,198,412 A | * | 3/1993 | Nagesh et al. | 505/413 |
| 5,650,697 A | * | 7/1997 | Imagi et al. | 318/400.3 |
| 6,051,952 A | * | 4/2000 | Moreira et al. | 318/738 |
| 6,329,783 B1 | * | 12/2001 | Vrionis et al. | 318/772 |
| 6,329,785 B1 | * | 12/2001 | Starkie et al. | 318/811 |
| 6,864,659 B2 | * | 3/2005 | Ratz et al. | 318/772 |
| 7,746,025 B2 | * | 6/2010 | Choi et al. | 318/772 |

* cited by examiner

*Primary Examiner* — Rita Leykin
(74) *Attorney, Agent, or Firm* — Polster, Lieder, Woodruff & Lucchesi, L.C.

(57) ABSTRACT

In various embodiments, the present disclosure provides a speed control system for a motor that includes a fixed speed control portion and a variable speed control portion. The fixed speed control portion is operable to control a speed of a motor in a fixed speed mode wherein the motor is operated at a preselected fixed speed below a predetermined fixed speed mode threshold speed. The variable speed control portion is operable to control the motor in a variable speed mode wherein the motor is operated such that a speed of the motor can be selectively varied within a range between the fixed speed mode threshold speed and a maximum motor speed. The system additionally includes a switching device structured and operable to selectively switch the speed control system between the fixed speed mode and the variable speed mode.

20 Claims, 4 Drawing Sheets

SYSTEMS AND METHOD FOR MOTOR SPEED CONTROL

CROSS-REFERENCE TO RELATED APPLICATIONS

This application claims the benefit of U.S. Provisional Application No. 61/297,501, filed on Jan. 22, 2010, the disclosure of which is incorporated herein by reference in its entirety.

FIELD

The present teachings relate to systems and methods for controlling the speed of an AC induction motor.

BACKGROUND

The statements in this section merely provide background information related to the present disclosure and may not constitute prior art.

Known variable speed controls for AC induction motors typically employ one or more triacs to control the motor speed. However, during operation of such known speed controls, the noise generated in the motor by operation of the speed control triac(s) at less than full on biasing can be undesirably loud at lower speeds and remain so until noise by the motor driven air moving device, such as a motor fan, overcomes, or masks, the triac induced noise at higher speeds.

SUMMARY

In various embodiments, the present disclosure provides a speed control system for a motor that includes a fixed speed control portion and a variable speed control portion. The fixed speed control portion is operable to control a speed of a motor in a fixed speed mode wherein the motor is operated at a preselected fixed speed below a predetermined fixed speed mode threshold speed. The variable speed control portion is operable to control the motor in a variable speed mode wherein the motor is operated such that a speed of the motor can be selectively varied within a range between the fixed speed mode threshold speed and a maximum motor speed. The system additionally includes a switching device structured and operable to selectively switch the speed control system between the fixed speed mode and the variable speed mode.

In various other embodiments, the present disclosure provides a motor system that includes a motor and a motor speed control system operatively connected to the motor for controlling operation of the motor such that the motor is operable at a preselected fixed speed below a predetermined fixed speed mode threshold speed and is operable such that a speed of the motor can be selectively varied within a range between the fixed speed mode threshold speed and a maximum motor speed. The speed control system includes a fixed speed control portion including an electrical connection to a motor winding lead end and an electrical connection to a motor winding trailing end. The fixed speed control portion is operable to control the motor in a fixed speed mode wherein that the motor is operable at the preselected fixed speed. The speed control system additionally includes a variable speed control portion including an electrical connection to a motor winding intermediate tap, an electrical connection to the motor winding trailing end, and a variable speed triac included in the electrical connection to the motor winding intermediate tap. The variable speed control portion is operable to control the motor in a variable speed mode wherein the speed of the motor can be selectively varied within the range between the fixed speed mode threshold speed and the maximum motor speed. The motor speeds between the fixed speed mode threshold speed and the maximum motor speed are motor speeds at which a noise generated by rotation of a motor driven air moving device, e.g., a motor fan, is sufficient to mask a triac chopping noise generated by operation of the variable speed triac. The speed control system further includes a switching device structured and operable to selectively switch the speed control system between the fixed speed mode and the variable speed mode.

In various yet other embodiments, the present disclosure provides a method for controlling the speed of a motor, wherein the method includes controlling the speed of a motor in a fixed speed mode utilizing a motor speed control system. The motor speed system includes a fixed speed control portion that is electrically connected to a lead end of a motor winding of the motor and to a trailing end of the motor winding. The fixed speed control portion is operable to operate the motor at a preselected fixed speed below a fixed speed mode threshold speed. The method additionally includes controlling the speed of the motor in a variable speed mode utilizing the motor speed control system. The motor speed control system further includes a variable speed control portion that is electrically connected to an intermediate tap of the motor winding and to the trailing end of the motor winding. The electrical connection to the motor winding intermediate tap includes a variable speed triac. The variable speed control portion is operable to operate the motor such that the speed of the motor can be selectively varied within a range between the fixed speed mode threshold speed and a maximum motor speed. The motor speeds between the fixed speed mode threshold speed and the maximum motor speed are motor speeds at which noise generated by a motor driven air moving device, e.g., a motor fan, is sufficient to mask a triac chopping noise generated by operation of the variable speed triac. The method further includes utilizing a switching device of the motor speed control system to selectively switch the speed control system between the fixed speed mode and the variable speed mode.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

DETAILED DESCRIPTION

Figure 1:
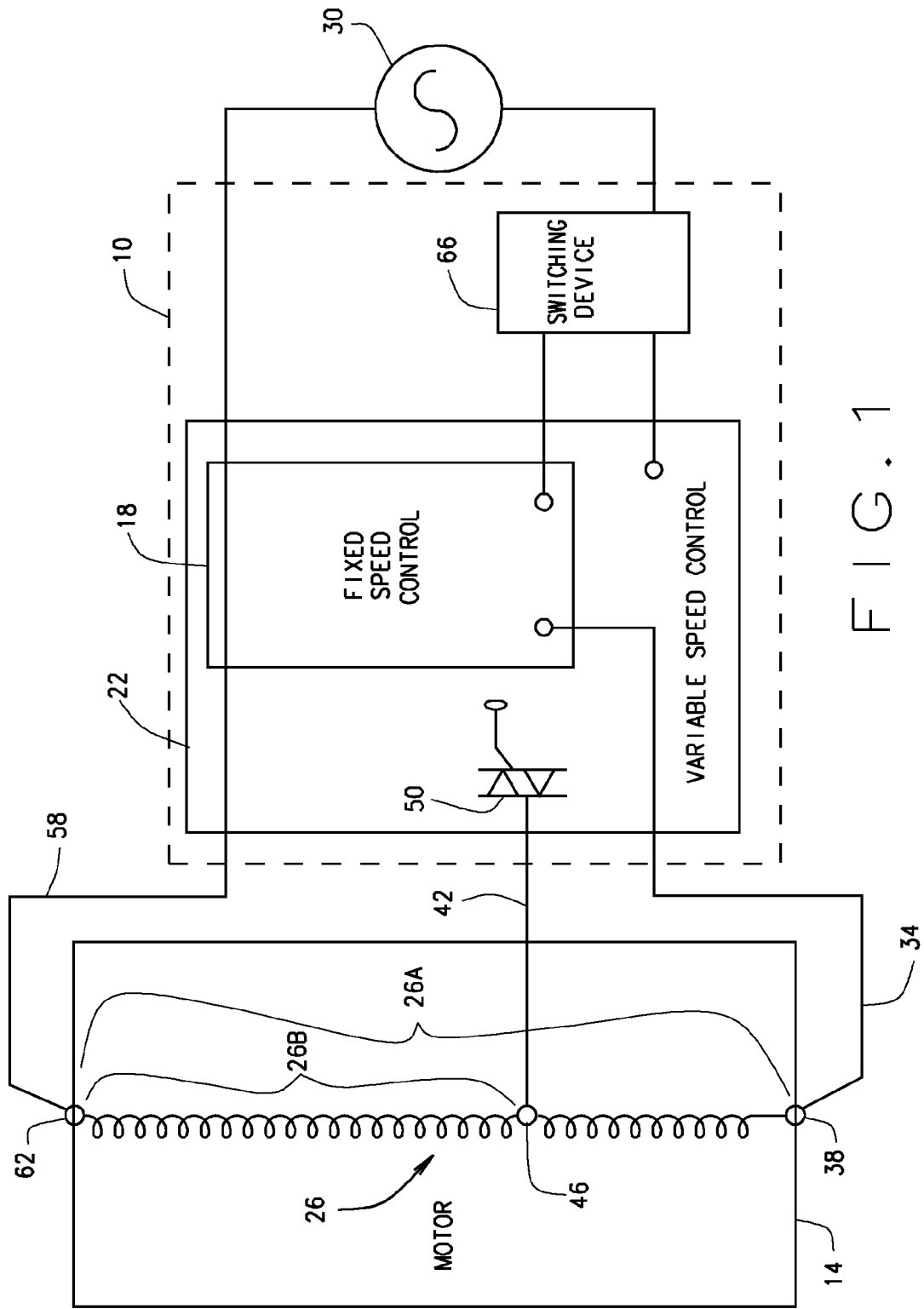
FIG. 1 is a schematic of a speed control system for an induction motor, in accordance with various embodiments of the present disclosure.

The following description is merely exemplary in nature and is in no way intended to limit the present teachings, application, or uses. Throughout this specification, like reference numerals will be used to refer to like elements.

Referring to FIG. 1, the present disclosure provides a speed control system 10 for an induction motor 14, e.g., a shaded pole motor or a permanent split capacitor motor. Generally, the speed control system 10 is structured and operable to control the speed of the motor 14 in two operation modes, the first being a fixed speed mode and the second being a variable speed mode. When in the fixed speed mode, the speed control system 10 is operable to operate the motor 14 at one or more preselected fixed speeds, i.e., one or more predetermined or preset fixed speeds, below a predetermined fixed speed mode threshold speed. The fixed speed mode threshold speed is a predetermined minimum speed at which the speed control system 10 will operate the motor 14 when in the variable speed mode. When in the variable speed mode, the speed control system 10 is operable to operate the motor 14 such that the speed of the motor can be selectively varied within a range between the fixed speed mode threshold speed and a maximum motor speed, i.e., the maximum rated speed of the motor 14. For example, if the motor 14 had a maximum rated speed of 5600 RPMs and the fixed speed mode threshold speed was preconfigured to be 2800 RPMS, when in the fixed speed mode, the speed control system 10 can be operable to operate the motor 14 at 1200 RPMs and/or 2400 RPMS, and when in the variable speed mode, the speed control system 10 can be operable to operate the motor 14 and any number of speeds between 2800 RPMs and 5600 RPMs as selected by a user of the motor 14.

The speed control system 10 generally includes a fixed speed control portion, or circuitry, 18 structured and operable to control operation of the motor 14 in the fixed speed mode, and a variable speed portion, or circuitry, 22 structured and operable to control operation of the motor 14 in the variable speed mode. As illustrated, the motor 14 includes a motor stator winding 26 operable to generate an electromagnetic flux field when a current from a power source 30 flows through the winding 26. The amount of current allowed to flow through the winding 26 and through which portion of the winding 26 is controlled by the speed control system 10, as described below, i.e., the current can flow through the entire winding 26 or a portion of the winding 26 as controlled by speed control system 10. The amount of current and the portion of the winding 26 through which the current is allowed to flow controls the amount of electromagnetic flux generated. The generated flux acts on, i.e., applies torques to, a rotor (not shown) of the motor, causing the rotor to rotate at a particular speed, wherein the rotor speed is referred to as motor speed. The greater the generated electromagnetic flux is, the great the applied torque, and the faster the rotor will rotate, i.e., the greater the motor speed. Hence, the speed control system 10 is structured and operable to control the amount of electromagnetic flux generated by the stator winding 26 to control the speed of the motor 14, as described below.

In various embodiments, the speed control system 10 includes a lead end electrical connection 34 to a lead end 38 of the winding 26, more particularly, the lead end electrical connection 34 is between the power source 30 and the lead end 38, via the fixed speed portion 18 of the speed control system 10. Hence, in such embodiments, the fixed speed portion 18 controls the flow of current to the winding lead end 38 to thereby operate the motor 14 at a particular predetermined fixed speed. Alternatively, the speed control system 10 can include other electrical connections (not shown) to the winding 26 at one or more tap points along the winding 26 (not shown), via the fixed speed portion 18 such that the speed control system 10 can operate the motor 14 at one or more predetermined fixed speeds. Although it should be understood that the speed control system 10 can include one or more electrical connections to the winding 26, via the fixed speed portion 18, such that when in the fixed speed mode the control system 10 is operable to operate the motor 14 at one or more predetermined fixed speeds, for simplicity and clarity only one connection to the winding 26, via the fixed speed portion 18 will be illustrated and described herein.

The speed control system 10 additionally includes an intermediate tap electrical connection 42 to an intermediate tap 46 of the winding 26, more particularly, the intermediate tap electrical connection 42 is between the power source 30 and the intermediate tap 46, via the variable speed portion 22 of the speed control system 10. The intermediate speed tap 46 segments the winding 26 into a fixed speed segment 26A and a variable speed segment 26B. The variable speed portion 22 controls the flow of current to the winding intermediate tap 46 to thereby operate the motor 14 at a user selectable speed between the fixed speed mode threshold speed and the maximum motor speed. Additionally, the variable speed portion 22 includes variable speed triac 50 disposed within the intermediate tap electrical connection 42. Operation of the variable speed triac 50 is controlled by the speed control system 10, as described below, to 'chop', or regulate, the flow of current from the power source 30 to the intermediate tap 46. As also described below, in various embodiments, the fixed speed portion can include one or more fixed speed triacs 74 that are biased either full on or full off, as opposed to the chopping of the variable speed triac 50. Controlling the flow of current to the intermediate tap 46 controls the amount of current flowing through and the voltage across the variable speed segment 26B of the winding. Accordingly, the speed of the motor 14 can be selectably varied between the fixed speed mode threshold speed and the maximum motor speed when the speed control system 10 is in the variable speed mode.

As used herein, the motor speeds between the fixed speed mode threshold speed and the maximum motor speed are motor speeds at which noise generated by rotation of a motor driven air moving device, such as a motor fan, (not shown) is greater than a triac chopping noise generated by operation of the variable speed triac 50, such that the air moving noise is sufficient to mask the triac chopping noise.

The speed control system 10 further includes a trailing end electrical connection 58 between a trailing end 62 of the motor winding 26 and the power source 30. As illustrated, the trailing end electrical connection 58 is included as part of both the fixed speed portion 18 and the variable speed portion 22 of the speed control system 10. Still further, the speed control system 10 includes a switching device 66 that is structured and operable to selectively switch the speed control system 10 between the fixed speed mode and the variable speed mode.

Figure 2:
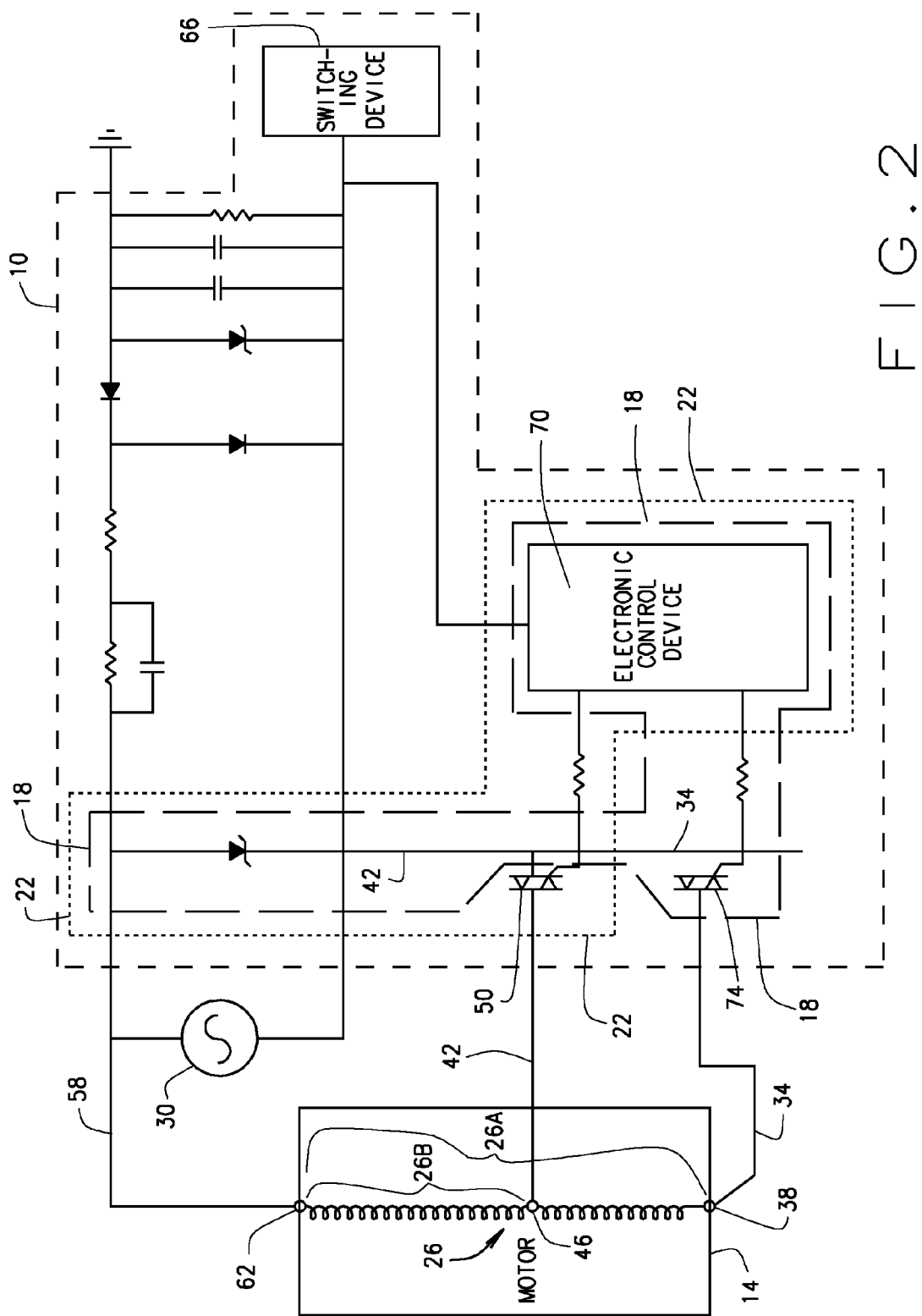
FIG. 2 is a schematic of the speed control system shown in FIG. 1 including an electronic switching device and an electronic triac control device, in accordance with various embodiments of the present disclosure.

Referring now to FIG. 2, in various embodiments the variable speed portion 22 includes an electronic control device 70, such as an application specific integrated circuit (ASIC) or microprocessor or other suitable electronic control mechanism, that is operable to control the operation of the variable speed triac 50 in order to control the amount of current flowing to the motor winding intermediate tap 46 and thereby control the speed of the motor 14 in the variable speed mode.

Additionally, the switching device 66 is an electronic switch that is structured and operable to receive selective speed input from a user and then send variable speed command signals to the electronic control device 70 in response to the user selective speed input. Then, in response to the speed command signals, the electronic control device 70 controls the operation of the variable speed triac 50 such that the motor 14 operates at a selected one of a plurality of speeds between the fixed speed mode threshold speed and the maximum motor speed based on the user selective speed input.

More specifically, the gate of the variable speed triac 50 is connected to the electronic control device 70 such that the electronic control device 70 controls the voltage bias across the variable speed triac 50, at less than full on bias, in accordance with the respective variable speed command received from the switching device 66. By controlling the voltage bias across the variable speed triac 50, the electronic control device 70 controls the operation of the variable speed triac 50 such that current flowing from the power source 30 to the winding intermediate tap 46, via the intermediate tap electrical connection 42, is 'chopped' by the variable speed triac 50 at a particular rate, thereby regulating the amount of current flowing through the variable speed segment 26B of the winding 26. The regulated current flow through the winding variable speed segment 26B, in turn, generates an electromagnetic flux field of a particular magnitude that causes the motor 14 to operate at a desired speed.

The motor speed can be selectively varied between the fixed speed mode threshold speed and the maximum motor speed simply by subsequently varying, or altering, the user speed input to the switching device 66. In response to the subsequent user speed input, the switching device 66 sends a subsequent speed command signal to the electronic control device 70, where after the electronic control device 70 controls the operation of the variable speed triac 50 to produce the desired motor speed, as described above. As described above, when the speed control system 10 is operating the motor 14 in the variable speed mode, the speed of the motor 14, more particularly, the speed of the motor driven air moving device, generates a fan noise that masks the noise, i.e., the chopping noise, generated by operation of the variable speed triac 50 at less than full on bias.

Additionally, in such embodiments, the fixed speed control portion 18 of the speed control system 10 also includes the electronic control device 70 and further includes a fixed speed triac 74 included in the lead end electrical connection 34 to the motor winding lead end 38. The electronic control device 70 is further operable to control the operation of the fixed speed triac 74 in order to control the amount of current flowing to the motor winding lead end 38 and thereby control the speed of the motor 14 in the fixed speed mode. Additionally, the switching device 66 is further structured and operable to receive a fixed speed input from a user and then send a fixed speed command signal to the electronic control device 70 in response to the fixed speed input. Then, in response to the fixed command signal, the electronic control device 70 controls the operation of the fixed speed triac 74 such that the motor 14 operates at a preselected speed.

More particularly, the gate of the fixed speed triac 74 is connected to the electronic control device 70 such that the electronic control device 70 controls the voltage bias across the fixed speed triac 74. Specifically, when the electronic control device 70 receives the fixed speed command signal from the switching device 66, the electronic control device 70 controls the gate of the fixed speed triac to apply a full on bias to fixed speed triac 74. By applying a full on bias to the fixed speed triac 74, the electronic control device 70 controls the operation of the fixed speed triac 50 such that a steady current flows from the power source 30 to the winding lead end 38, and more particularly, through the winding fixed speed segment 26A. The steady current flow through the winding fixed speed segment 26A, in turn, generates an electromagnetic flux field of a particular magnitude that causes the motor 14 to operate at the preselected fixed speed. It should be noted that when the fixed speed triac 74 is operated at a full on bias, the fixed speed triac 74 does not generate any chopping noise.

Furthermore, as described above, in various embodiments the speed control system 10 can be structured and operable to have more than one preselected fixed speed. In such embodiments, the fixed speed portion would include additional interstitial electrical connections to the winding 26 at interstitial taps located between the winding lead end 38 and the intermediate tap 46. Additionally, each interstitial connection would include a respective interstitial triac having its respective gate connected to the electronic control device 70. Furthermore, the switching device 66 would be structured and operable to receive more than one fixed speed user input. Accordingly, the user could provide a particular fixed speed input to select a particular one of the preselected fixed speeds. Subsequently, the electronic control device 70 will apply a full on bias to the interstitial triac that corresponds to the selected fixed speed, at which point a steady current flows from the power source 30 to the respective interstitial tap, and more particularly, through the winding from the interstitial tap to the trailing end 62. The steady current flow through the respective interstitial fixed speed segment of the winding, in turn, generates an electromagnetic flux field of a particular magnitude that causes the motor 14 to operate at the respective preselected fixed speed. Hence, the respective fixed speed is a function of the length of the winding between the interstitial tap or the winding lead end 38 and the winding trailing end 62.

It should be noted that when the respective interstitial triac is operated at a full on bias, the respective interstitial triac does not generate any chopping noise.

In various embodiments, in response to the received fixed speed command signal, the electronic control device 70 is further operable to operate the variable speed triac 50, or an interstitial fixed speed triac, at a motor start bias for a preselected brief period of time to provide sufficient current to start the motor 14. Specifically, the motor start bias allows a motor start current to flow from the power source 30, through the respective intermediate tap connection 42 or interstitial electrical connection to the respective motor winding intermediate tap 46 or interstitial tap. The motor start current is sufficient to generate an electromagnetic flux field in the motor windings 26 powerful enough to overcome a starting friction of the motor 14. Subsequently, after the preselected time period, the electronic control device 70 switches to operate the fixed speed triac 74, or the respective selected interstitial fixed speed triac, at the fixed speed bias, i.e., full on bias, such that the motor 14 operates at the desired preselected fixed speed. Applying the motor start bias to the variable speed triac 50, or an interstitial fixed speed triac, provides sufficient current to the motor winding 26 to start the motor 14 from a static, or off, state when the selected fixed speed's current is insufficient to start the motor 14 from the static, or off, state.

That is, the purpose of applying the motor start bias prior to applying the fixed speed bias to the respective fixed speed triac 74 or interstitial triac is to be able to operate the motor 14 at a lower fixed speed than the motor 14 would operate at if only the motor start bias was applied. By supplying more power for a very short time, the motor starts to turn and then the bias is switched to the selected fixed speed bias prior to the motor coming to the speed corresponding to the motor start bias/current. Hence, electronic control device 70 operates to start the motor 14 at a current high enough to turn the motor at a higher speed than the selected fixed speed, and then switches to the selected fixed speed prior to the motor 14 acquiring a fixed speed corresponding the motor start bias/current.

Figure 4:
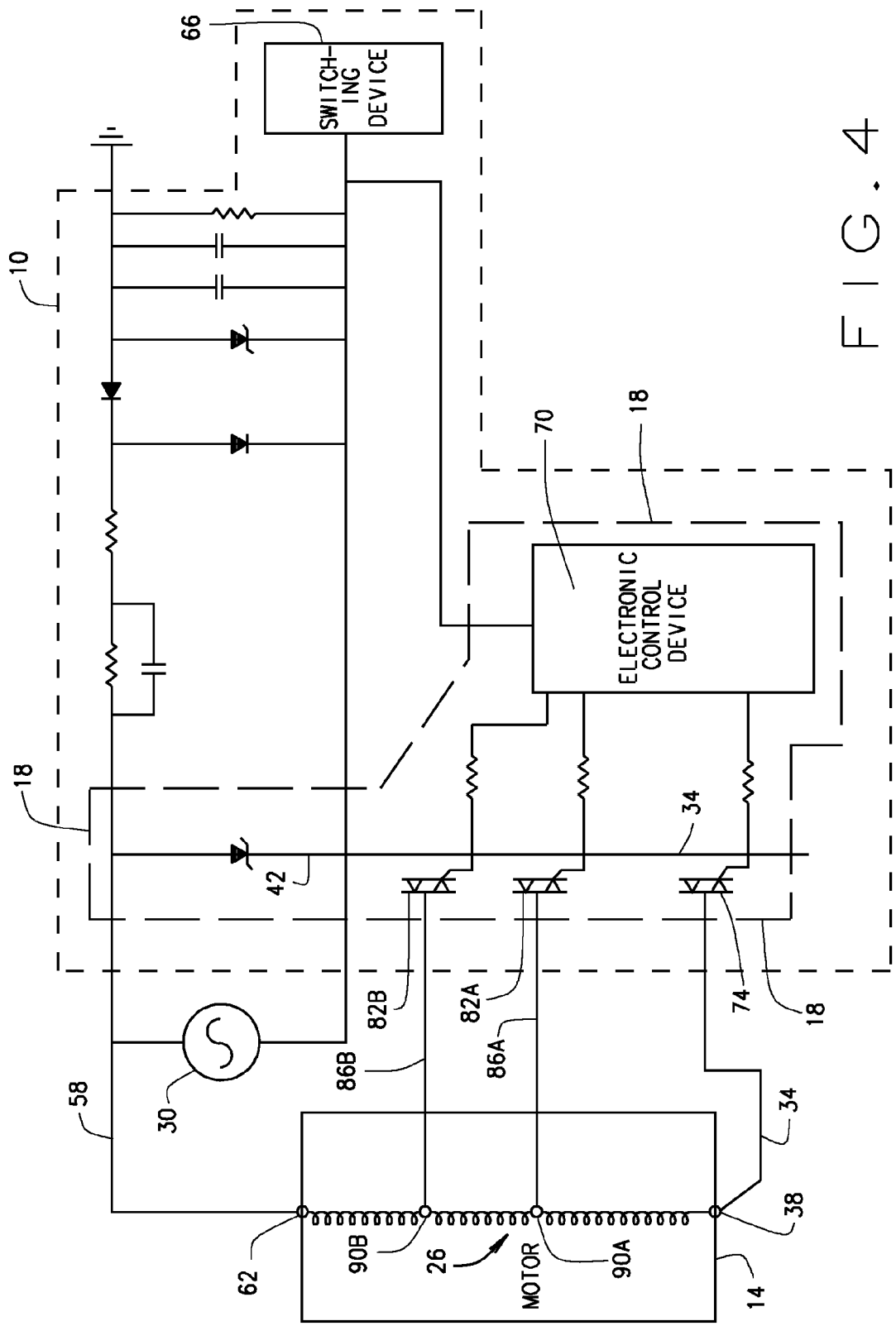
FIG. 4 is a schematic of the speed control system shown in FIG. 1 having only a fixed speed portion, in accordance with various embodiments of the present disclosure.

Referring now to FIG. 4, in various embodiments, the control system 10 can include only the fixed speed portion 18 that includes the end fixed speed triac 74, the lead end electrical connection 34, the winding lead end 38, and a plurality of interstitial fixed speed triacs 82, e.g., interstitial fixed speed triacs 82A and 82B, with the corresponding interstitial electrical connections 86, e.g., interstitial electrical connections 86A and 86B, and interstitial winding taps 90, e.g., interstitial tap 90A and 90B. In such embodiments, in response to fixed speed command signals from the switching device 66, the electronic control device 70 operates each of the end fixed speed triac 74 and the interstitial fixed speed triacs 82 at either full on or full off bias, in the manner described above, to operate the motor 14 at a selected one of a plurality of preselected fixed speeds. For example, to operate the motor 14 at a lowest preselected fixed speed, the electronic control device 70 would apply full on bias to the end fixed speed triac 74 while maintaining the interstitial triacs 82A and 82B in a full off state. Then, to operate the motor 14 at a first higher speed, the electronic control device 70 would apply full on bias to the interstitial triac 82A while maintaining the end fixed speed triac 74 and the interstitial triac 82B in a full off state. Further, to operate the motor 14 at a second higher speed, the electronic control device 70 would apply full on bias to the interstitial triac 8B2 while maintaining the end fixed speed triac 74 and the interstitial triac 82A in a full off state.

However, in such embodiments, the current supplied to the motor winding 26 via the end fixed speed triac 74 to operate the motor 14 at the lowest preselected speed, may not be sufficient to over the starting friction of the motor 14. Hence, in such instances, in response to the received fixed speed command signal, the electronic control device 70 operates one of the interstitial fixed speed triac 82 at a motor start bias, i.e., full on bias, for a preselected brief period of time to provide sufficient current to start the motor 14. Specifically, momentarily applying full on bias to one of the interstitial fixed speed triacs 82 allows a motor start current to flow from the power source 30, through the respective interstitial electrical connection 86 to the respective motor winding interstitial tap 90. As described above, the motor start current is sufficient to generate an electromagnetic flux field in the motor windings 26 powerful enough to overcome a starting friction of the motor 14.

Subsequently, after the preselected time period, the electronic control device 70 turns off the respective interstitial fixed speed triac 82, i.e., the interstitial fixed speed triac is biased full off, and applies full on bias to the end fixed speed triac 74 such that the motor 14 operates at the desired preselected fixed speed corresponding to the current supplied via the fixed speed triac 74. Applying the motor start bias, i.e., full on bias, to the selected interstitial fixed speed triac 82 provides sufficient current to the motor winding 26 to start the motor 14 from a static, or off, state when the fixed speed current associated with the end fixed speed triac 74 is insufficient to start the motor 14 from the static, or off, state.

That is, the purpose of momentarily applying the full on bias to an interstitial fixed speed triac 82 prior to applying the full on bias to the end fixed speed triac 74 is to be able to operate the motor 14 at a lower fixed speed than a speed associated with a current required to overcome the motor starting friction. By supplying more power for a very short time, the motor 14 starts to turn and then the full on bias is switched from the interstitial fixed speed triac 82 to the end fixed speed triac 74 prior to the motor coming to the speed corresponding to the full on bias current of the interstitial fixed speed triac 82.

Figure 3:
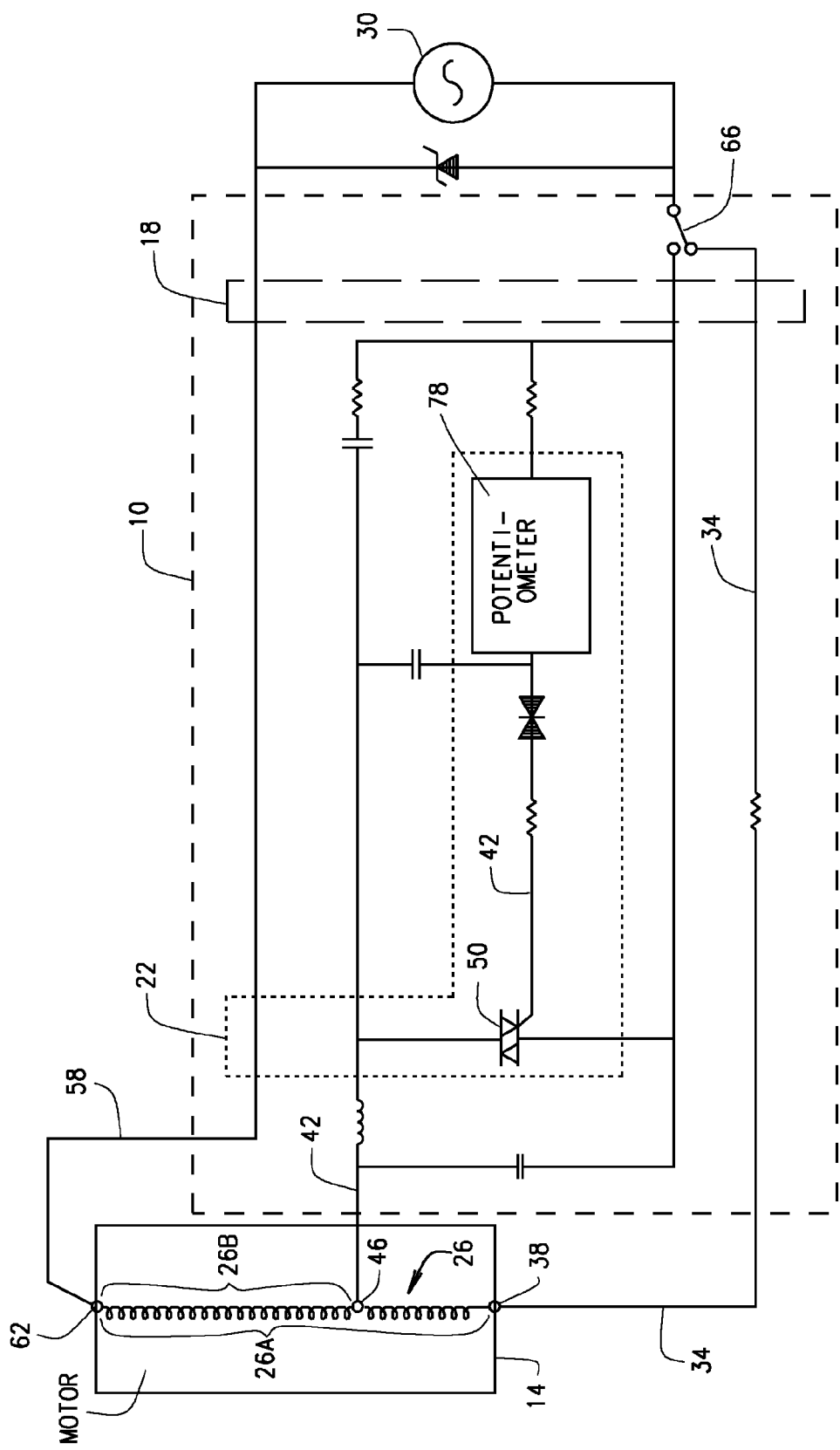
FIG. 3 is a schematic of the speed control system shown in FIG. 1 including a mechanical switching device and a manually controllable potentiometer, in accordance with various embodiments of the present disclosure.

Referring now to FIG. 3, in various embodiments the variable speed portion 22 includes a potentiometer 78 that is operable to control the operation of the variable speed triac 50 in order to control the amount of current flowing to the motor winding intermediate tap 46 and thereby control the speed of the motor 14. Additionally, the switching device 66 is a mechanical switch structured and operable to direct current from a power source 30 to the potentiometer 78 when the switching device 66 is manually placed in a variable speed position. When placed in the variable speed position, the switching device 66 directs current from the power source 30 to the potentiometer 78 so that the potentiometer 78 can control the operation of the variable speed triac 50 in order to operate the motor 14 at a variably selectable speed between the fixed speed mode threshold speed and the maximum motor speed base on a user selected setting of the potentiometer 78.

More specifically, the gate of the variable speed triac 50 is connected to the potentiometer 78 such that the potentiometer 78 controls the voltage bias across the variable speed triac 50, at less than full on bias, in accordance with a respective user setting of the potentiometer 78. By controlling the voltage bias across the variable speed triac 50, the potentiometer 78 controls the operation of the variable speed triac 50 such that current flowing from the power source 30 to the winding intermediate tap 46, via the intermediate tap electrical connection 42, is 'chopped' by the variable speed triac 50 at a particular rate, thereby regulating the amount of current flowing through the variable speed segment 26B of the winding 26. The regulated current flow through the winding variable speed segment 26B, in turn, generates an electromagnetic flux field of a particular magnitude that causes the motor 14 to operate at a desired speed.

The motor speed can be selectively varied between the fixed speed mode threshold speed and the maximum motor speed simply by subsequently varying, or altering, the user adjustable setting of the potentiometer 78. In response to a subsequent user adjustment of the potentiometer 78, potentiometer 78 changes the bias across the variable speed triac 50 to provide a subsequent current flow to the intermediate tap 46, thereby producing the desired subsequent motor speed, as described above. As described above, when the speed control system 10 is operating the motor 14 in the variable speed mode, the speed of the motor 14, more particularly, the speed of the motor driven air moving device, generates a fan noise that masks the noise, i.e., the chopping noise, generated by operation of the variable speed triac 50 at less than full on bias.

In such embodiments, the mechanical switch, i.e., the switching device 66, is further structured and operable to direct current from the power source 30 to the motor winding lead end 38, via the lead end electrical connection 34 such that the motor 14 operates at the preselected fixed speed when the switching device 66 is manually placed in a fixed speed position.

Furthermore, as described above, in various embodiments the speed control system 10 can be structured and operable to have more than one preselected fixed speed. In such embodiments, the fixed speed portion would include additional interstitial electrical connections to the winding 26 at interstitial taps located between the winding lead end 38 and the intermediate tap 46. Additionally, the switching device 66 would be a multi-pole/multi-position mechanical switch configurable to be manually placed in a plurality of fixed speed positions and the variable speed position. Each interstitial electrical connection would additionally be connected to a respective one of the poles of the switching device 66.

Accordingly, the user could manually select a desired fixed speed position of switching device 66 at which point a steady current flows from the power source 30 to the leading end 38 or the respective interstitial tap, and more particularly, through the winding from the leading end 38 or the respective interstitial tap to the trailing end 62. The steady current flow through the leading end fixed speed segment 26A or the respective interstitial fixed speed segment of the winding, in turn, generates an electromagnetic flux field of a particular magnitude that causes the motor 14 to operate at the respective preselected fixed speed. Hence, the respective fixed speed is a function of the length of the winding between the interstitial tap or the end 38 and the trailing end 62 of the winding 26.

In addition to the components and circuitry described above, the speed control system 10 can include various other electrical components and circuitry (some of which are exemplarily illustrated in the various figures) within speed control system 10 that condition and further control the flow of current throughout the speed control system 10 as desired and/or necessary with regard to the operation specifications of respective motor 14 and the operational specification of the components and circuitry described above. The description of such additional components is not germane to the full description and not necessary for enablement and full understanding of the present disclosure by one skilled in the art. Accordingly, such additional components are not described herein.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A speed control system for a motor, said speed control system comprising:
   a fixed speed control portion operable to control a speed of a motor in a fixed speed mode wherein the motor is operated at a preselected fixed speed below a predetermined fixed speed mode threshold speed;
   a variable speed control portion operable to control the motor in a variable speed mode wherein the motor is operated such that a speed of the motor can be selectively varied within a range between the fixed speed mode threshold speed and a maximum motor speed; and
   a switching device structured and operable to selectively switch the speed control system between the fixed speed mode and the variable speed mode.

2. The system of claim 1, wherein the motor speeds between the fixed speed mode threshold speed and the maximum motor speed are motor speeds at which a noise generated by rotation of a motor driven air moving device masks a triac chopping noise generated in the motor by operation of the variable speed triac.

3. The system of claim 1, wherein the fixed speed control portion includes an electrical connection to a motor winding lead end and an electrical connection to a motor winding trailing end; and
   the variable speed control portion includes an electrical connection to a motor winding intermediate tap, an electrical connection to the motor winding trailing end, and a variable speed triac included in the electrical connection to the motor winding intermediate tap.

4. The system of claim 3, wherein the variable speed control portion further includes an electronic control device operable to control the operation of the variable speed triac to control the amount of current flowing to the motor winding intermediate tap and thereby control the speed of the motor in the variable speed mode; and
   the switching device is structured and operable to receive selective speed input from a user and to send variable speed command signals to the electronic control device, in response to the user selective speed input, to operate the variable speed triac such that the motor operates at a selected one of a plurality of speeds between the fixed speed mode threshold speed and the maximum motor speed base on the user selective speed input.

5. The system of claim 4, wherein the fixed speed control portion further includes the electronic control device and a fixed speed triac included in the electrical connection to the motor winding lead end; and
   wherein the electronic control device is further operable to control the operation of the fixed speed triac to control the amount of current flowing to the motor winding lead end and thereby control the speed of the motor in the fixed speed mode; and
   wherein the switching device is further structured and operable to receive a fixed speed input from the user and to send a fixed speed command signal to the electronic control device, in response to the user fixed speed input, to operate the fixed speed triac at a fixed speed bias such that the motor operates at the preselected fixed speed and the fixed speed triac does not generate a chopping noise.

6. The system of claim 5, wherein, in response to the received fixed speed command signal, the electronic control device is further operable to operate a interstitial fixed speed triac at a motor start bias such that a motor start current flows through an interstitial electrical connection to an interstitial motor winding tap that is sufficient to cause the motor winding to generate enough power to overcome a starting friction of the motor, then after a preselected time period, the electronic control device switches to operate the fixed speed triac at the fixed speed bias such that the motor operates at the preselected fixed speed.

7. The system of claim 3, wherein the variable speed control portion further includes a potentiometer operable to control the operation of the variable speed triac to control the amount of current flowing to the motor winding intermediate tap and thereby control the speed of the motor; and
   the switching device is a mechanical switch structured and operable to direct current from a power source to the potentiometer when the switch is placed in a variable speed position such that the potentiometer controls the operation of the variable speed triac to operate the motor at a variably selectable speed between the fixed speed mode threshold speed and the maximum motor speed base on a user selected setting of the potentiometer.

8. The system of claim 7, wherein the mechanical switch is further structured and operable to direct current from the power source to the motor winding lead end, via the electrical connection to the motor winding lead end, such that the motor operates at the preselected fixed speed.

9. A motor system, said system comprising:
   a motor; and
   a motor speed control system operatively connected to the motor for controlling operation of the motor such that the motor is operable at a preselected fixed speed below a predetermined fixed speed mode threshold speed and is operable such that a speed of the motor can be selectively varied within a range between the fixed speed mode threshold speed and a maximum motor speed, the speed control system comprising:
- a fixed speed control portion including an electrical connection to a motor winding lead end and an electrical connection to a motor winding trailing end, the fixed speed control portion operable to control the motor in a fixed speed mode wherein that the motor is operable at the preselected fixed speed;
- a variable speed control portion including an electrical connection to a motor winding intermediate tap, an electrical connection to the motor winding trailing end, and a variable speed triac included in the electrical connection to the motor winding intermediate tap, the variable speed control portion operable to control the motor in a variable speed mode wherein the speed of the motor can be selectively varied within the range between the fixed speed mode threshold speed and the maximum motor speed, the motor speeds between the fixed speed mode threshold speed and the maximum motor speed being motor speeds at which a noise generated by rotation of a motor driven air moving device masks a triac chopping noise generated in the motor by operation of the variable speed triac; and
- a switching device structured and operable to selectively switch the speed control system between the fixed speed mode and the variable speed mode.

10. The system of claim 9, wherein the variable speed control portion further includes an electronic control device operable to control the operation of the variable speed triac to control the amount of current flowing to the motor winding intermediate tap and thereby control the speed of the motor in the variable speed mode; and
the switching device is structured and operable to receive selective speed input from a user and to send variable speed command signals to the electronic control device, in response to the user selective speed input, to operate the variable speed triac such that the motor operates at a selected one of a plurality of speeds between the fixed speed mode threshold speed and the maximum motor speed base on the user selective speed input.

11. The system of claim 10, wherein the fixed speed control portion further includes the electronic control device and a fixed speed triac included in the electrical connection to the motor winding lead end; and
wherein the electronic control device is further operable to control the operation of the fixed speed triac to control the amount of current flowing to the motor winding lead end and thereby control the speed of the motor in the fixed speed mode; and
wherein the switching device is further structured and operable to receive a fixed speed input from the user and to send a fixed speed command signal to the electronic control device, in response to the user fixed speed input, to operate the fixed speed triac at a fixed speed bias such that the motor operates at the preselected fixed speed and the fixed speed triac does not generate a chopping noise.

12. The system of claim 11, wherein, in response to the received fixed speed command signal, the electronic control device is further operable to operate the fixed speed triac at a motor start bias such that a motor start current flows through an interstitial electrical connection to an interstitial motor winding tap that is sufficient to cause the motor winding to generate enough power to overcome a starting friction of the motor, then after a preselected time period, the electronic control device switches to operate the fixed speed triac at the fixed speed bias such that the motor operates at the preselected fixed speed.

13. The system of claim 9, wherein the variable speed control portion further includes a potentiometer operable to control the operation of the variable speed triac to control the amount of current flowing to the motor winding intermediate tap and thereby control the speed of the motor; and
the switching device is a mechanical switch structured and operable to direct current from a power source to the potentiometer when the switch is placed in a variable speed position such that the potentiometer controls the operation of the variable speed triac to operate the motor at a variably selectable speed between the fixed speed mode threshold speed and the maximum motor speed base on a user selected setting of the potentiometer.

14. The system of claim 13, wherein the mechanical switch is further structured and operable to direct current from the power source to the motor winding lead end, via the electrical connection to the motor winding lead end, such that the motor operates at the preselected fixed speed.

15. A method for controlling the speed of a motor, said method comprising:
controlling the speed of a motor in a fixed speed mode utilizing a motor speed control system including a fixed speed control portion electrically connected to a lead end of a motor winding of the motor and to a trailing end of the motor winding such that the fixed speed control portion is operable to operate the motor at a preselected fixed speed below a fixed speed mode threshold speed;
controlling the speed of the motor in a variable speed mode utilizing the motor speed control system further including a variable speed control portion electrically connected to an intermediate tap of the motor winding and to the trailing end of the motor winding, the electrical connection to the motor winding intermediate tap including a variable speed triac, such that the variable speed control portion is operable to operate the motor such that the speed of the motor can be selectively varied within a range between the fixed speed mode threshold speed and a maximum motor speed, the motor speeds between the fixed speed mode threshold speed and the maximum motor speed being motor speeds at which a noise generated by rotation of a motor driven air moving device masks a triac chopping noise generated in the motor by operation of the variable speed triac; and
utilizing a switching device of the motor speed control system to selectively switch the speed control system between the fixed speed mode and the variable speed mode.

16. The system of claim 15, wherein controlling the speed of the motor in the variable speed mode comprises:
utilizing the switching device to receive selective speed input from a user and to send variable speed command signals to an electronic control device of the motor speed control system in response to the user selective speed input; and
in response to the variable speed command signals, utilizing the electrical control device to control the operation of the variable speed triac to control the amount of current flowing to the motor winding intermediate tap such that the motor operates at a selected one of a plurality of speeds between the fixed speed mode threshold speed and the maximum motor speed base on the user selective speed input.

17. The system of claim 16, wherein the fixed speed control portion includes a fixed speed triac included in the electrical connection to the motor winding lead end, and wherein controlling the speed of the motor in the fixed speed mode comprises:

utilizing the switching device to receive a fixed speed input from the user and to send a fixed speed command signal to the electronic control device in response to the user fixed speed input; and in response to the fixed speed command signal, utilizing the electronic control device to operate the fixed speed triac at a fixed speed bias to control the amount of current flowing to the motor winding lead end such that the motor operates at the preselected fixed speed and the fixed speed triac does not generate a chopping noise.

18. The system of claim 15, wherein the switching device is a mechanical switch and wherein controlling the speed of the motor in the variable speed mode comprises:

utilizing the switching device to direct current from a power source to a potentiometer of the speed control system variable speed portion when the switch is placed in a variable speed position; and utilizing the potentiometer to control operation of the variable speed triac to control the amount of current flowing to the motor winding intermediate tap to thereby operate the motor at a variably selectable speed between the fixed speed mode threshold speed and the maximum motor speed based on a user selected setting of the potentiometer.

19. The system of claim 18, wherein controlling the speed of the motor in the fixed speed mode comprises utilizing the mechanical switch to direct current from the power source to the motor winding lead end, via the electrical connection to the motor winding lead end, such that the motor operates at the preselected fixed speed.

20. A speed control system for a motor, said speed control system comprising:

an end fixed speed triac connected to a motor winding lead end via an end fixed speed electrical connection;

a plurality of interstitial fixed speed triacs, each interstitial connected to a corresponding motor winding interstitial fixed speed tap via a corresponding interstitial fixed speed electrical connection;

an electronic control device operable to apply full on or full off bias to the end fixed speed triac and each of the interstitial fixed speed triacs such that the motor operates a corresponding preselected fixed speed; and a switching device structured and operable to send fixed speed command signals to the electronic control device such that the electronic control device will apply a full on bias to a particular one of the end fixed speed triac and the interstitial fixed speed triacs so that the motor will operated at a selected one of a lowest speed associated with the full on biasing of the end fixed speed triac and plurality of higher speeds each associated with full on biasing of one of the interstitial fixed speed triacs, wherein the electronic control device is further operable to momentarily apply full on biasing to a selected one of the interstitial fixed speed triacs in order to supply a motor start current to the motor winding sufficient to overcome a starting friction of the motor then, prior to the motor reaching the fixed speed associated with full biasing of the selected interstitial fixed speed triac, apply full off biasing to the selected interstitial fixed speed triac and apply full on biasing to the end fixed speed triac such that the motor can operate a the lowest speed when the current associated with full on biasing of the end fixed speed triac is insufficient to overcome the motor starting friction.

\* \* \* \* \*